United States Patent

[11] 3,570,569

[72] Inventors Richard S. Hartley;
  Harold D. Hannah, Troy, Ohio
[21] Appl. No. 821,632
[22] Filed May 5, 1969
[45] Patented Mar. 16, 1971
[73] Assignee The Hobart Manufacturing Company
  Troy, Ohio

[54] FOOD MIXING MACHINE
  5 Claims, 3 Drawing Figs.
[52] U.S. Cl. .................................................. 146/186,
  146/79, 259/46
[51] Int. Cl. ...................................................... B02c 18/22,
  B01f 15/02
[50] Field of Search .......................................... 146/186,
  187, 188, 189, 181, 79; 259/41—44, 45, 46

[56] References Cited
  UNITED STATES PATENTS
3,310,086 3/1967 Lasar ............................. 146/186
3,461,934 8/1969 Waters .......................... 146/79
3,506,019 4/1970 Holly ............................. 259/46

Primary Examiner—Willie G. Abercrombie
Attorney—Marechal, Biebel, French & Bugg

ABSTRACT: A food mixing machine incorporates a hopper with a rotatable mixing member extending lengthwise thereto and a trough along the bottom of the hopper through which a discharge screw extends. The end of the screw continues into a barrel of a food grinding or chopping machine. A motor is connected to rotate both the mixing member and the screw, with the drive to the screw being through a one-way clutch. Rotation of the motor in one direction causes the screw to discharge material from the hopper while the mixing member is rotated, and rotation of the motor in the other direction causes the mixing member to mix materials in the hopper without transmitting power to the screw. The mixing member is mounted for simple uncoupling and removal from the hopper in order to clean the same.

Patented March 16, 1971 3,570,569

*INVENTORS*
RICHARD S. HARTLEY &
HAROLD D. HANNAH

FOOD MIXING MACHINE

BACKGROUND OF THE INVENTION

This invention relates particularly to machines for mixing and grinding or otherwise processing food products, usually meat products. Meat mixers which are employed to mix different kinds of meat, with or without condiments and spices, ordinarily dump the mixed product into a conventional screw-type food grinder where the mixed product is further processed. Combination machines have been provided wherein a discharge screw is mounted at the bottom of the hopper and carries the mixed product from the hopper once it is prepared. Typical of this type of machine is the apparatus disclosed in U.S. Pat. No. 1,750,645, issued Mar. 18, 1930. Various modifications of this arrangement have been proposed, such as machines in which the mixing arms operate only while the discharge screw is operating, and machines in which various gates or hopper openings are provided over a rather small exit to the discharge screw. Where there is no provisions for mixing separate from the discharge opening, in some instances the time of mixing available in the machine may not be adequate. Where gates or similar devices are used to control discharge from the hopper, the cleaning and sterilizing of the machine is more difficult since food products tend to cling or pack into crevices and around the edges of the gate.

SUMMARY OF THE INVENTION

The present invention provides a simplified mixing machine with a screw-type discharge. The discharge screw may be incorporated as part of the grinding screw of a food grinding machine having a barrel extending around the grinder screw coaxial with the discharge screw, or the discharge screw may merely carry the product into a tube leading to some other form of food processing machine, such as a loafing attachment, a patty former, or the like.

A single drive motor is connected to rotate both the mixing member in the hopper of the machine and the discharge screw. The drive connection from the motor to the discharge screw is through a one-way clutch. Thus, by the simple expedient of reversing the direction of rotation of the drive, the discharge screw may or may not be rotated while the mixing member continues to rotate. In that direction of rotation producing discharge from the hopper, the arms of the mixing member are so arranged that they tend to push the food product most effectively toward the screw and the trough within which it extends.

This arrangement eliminates any gates, complicated clutching arrangements, etc. and provides a simplified construction which may readily be disassembled for cleaning. The mixing member is driven through a simple knuckle-type joint at one end of the mixing member, and the other end of the mixing member is mounted on a removable stud providing a bearing connection for rotatable mounting of the mixing member. Simply by removing this stud it is possible to withdraw the entire mixing member from the hopper, and the portion of the drive knuckle remaining exposed in the hopper can be easily and thoroughly cleaned.

Thus the principal object of the invention is to provide a food mixing machine with a discharge conveyor that is easily selectively operated, which is easy to clean and maintain, and which may include food grinding apparatus or some other form of food processing equipment as part of the discharge.

Other objects and advantages of the invention will be apparent from the following description, the accompanying drawings and the appended claims.

DESCRIPTION OF THE PREFERRED EMBODIMENT

Figure 1:
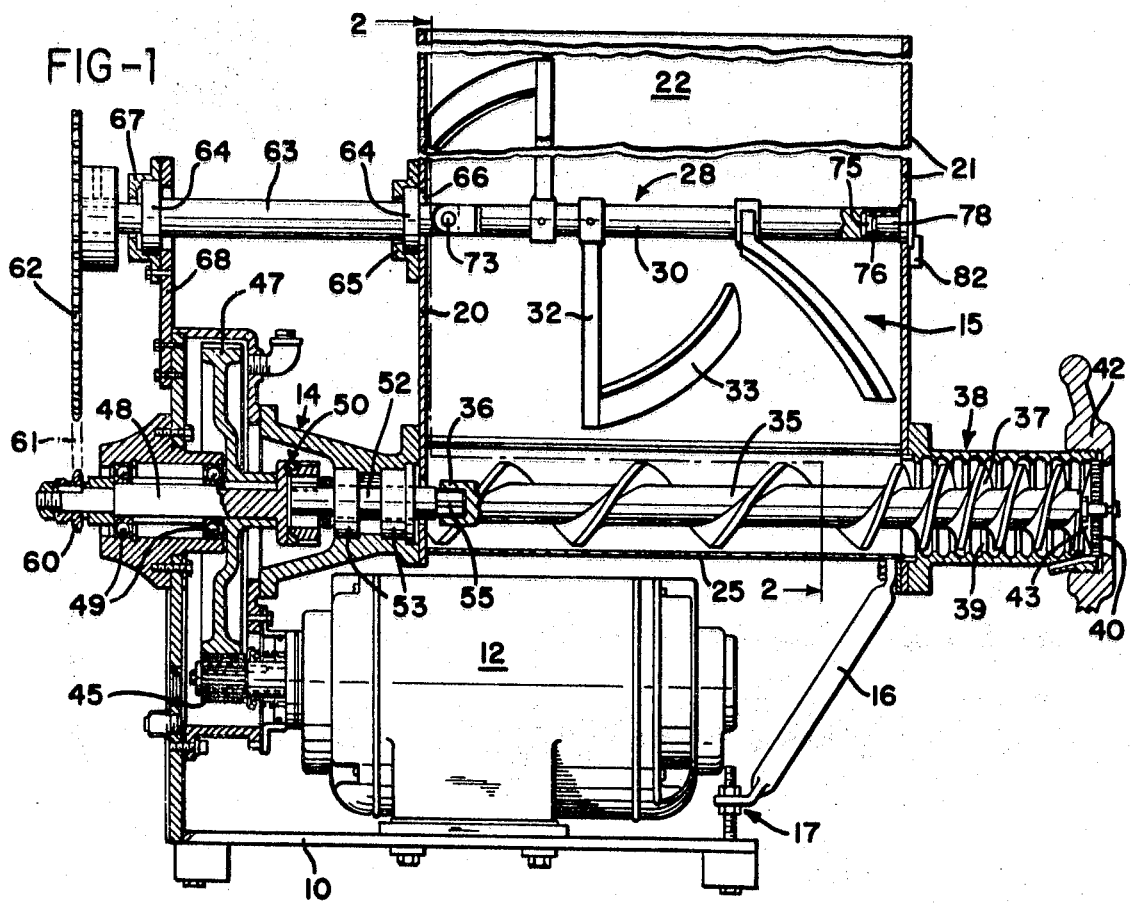
FIG. 1 is a cross-sectional view taken vertically through a food mixing machine constructed according to the invention, with the hopper shown broken to decrease the height of the view, and the drive motor shown in elevation.

Referring to the drawing, which discloses a preferred embodiment of the invention, the food mixing machine includes a base 10 providing a mounting for a drive motor 12, a gear case 14, and a hopper 15. It will be noted that the rearward end of the hopper 15 is supported on the hear case 14, and the forward end of the hopper is supported by a brace or arm 16, which has an adjustable connection 17 to the base for purposes of leveling the hopper. Since the machines are designed primarily for handling food products, the hopper is preferably constructed of stainless steel sheet to avoid corrosion resulting from the repeated cleaning that is necessary.

The hopper includes a rear wall 20, a front wall 21, and sidewalls 22 which have lower portions 23 extending downwardly and inwardly, preferably symmetrically, to a trough or depression 25 formed in the bottom of the hopper. Within the hopper is a mixing member 28 including a shaft 30 having a plurality of outwardly extending arms 32 with curved arm extensions 33 arranged to lift and mix material placed in the hopper as the mixing member is rotated. The hopper could have an open top, since in operation the mixing member rotates rather slowly. However, it is preferred to have a cover (not shown) with appropriate safety switches in the control circuit of motor 12 actuated by opening of the cover to prevent motor operation. The extensions 33 preferably are curved to form somewhat of a scoop which tends to lift the material along one wall (the left wall as viewed in FIG. 2) of the hopper while tending to carry the material downward along the other wall toward the trough 25.

At the bottom of the hopper, extending along and generally within the trough 25, there is a discharge screw 35 which includes a drive socket 36. Screw 35 may include a forward grinding screw portion 37 operating within a grinder barrel 38 that is mounted onto the lower part of the forward wall 21, and partially supported by the brace 16, at the forward end of trough 25. The grinder construction, when used, is generally conventional and may include an internal flute 39 within the barrel 38, a perforated grinder plate 40 mounted at the end of the barrel and held in place by a ring 42, and knife 43 mounted on the end of the screw shaft and cooperating with the inside surface of the plate 40. In constructions where this grinding mechanism is not desired, the discharge screw 35 may merely extend into a tubular opening at the lower forward portion of the hopper front wall.

The drive construction for the unit includes a pinion 45 on the end of the output shaft of motor 12, extending into the gear case 14. This pinion drives a main gear 47 which is fastened to shaft 48 carried in bearings 49 within the gear case. Also within the gear case, at the forward end of shaft 48, there is a one-way clutch 50, which may be a conventional roller-type clutch that is driven from shaft 48. The output of this clutch is to an intermediate shaft 52 mounted in bearings 53 and extending at its forward end through the rear wall 20 of the hopper, ending in a drive shank 55 of noncircular (e.g. square) cross section, onto which the socket 36 is fitted to transmit torque to the screw 35.

The drive shaft 48 extends outward rearwardly of the gear case 14 and has a small sprocket 60 fastened to it, and this sprocket is connected through a chain 61 to rotate a larger sprocket 62 connected to the outer end of a countershaft 63. This shaft is supported on forward and rear bearings 64 carried respectively on a cap 65 mounted onto the rear hopper wall 20 around an opening 66 which admits the forward end of shaft 63, and at the rear on a similar cap 67 which is fastened to an extension plate 68 projecting upwardly from the gear case.

Figure 3:
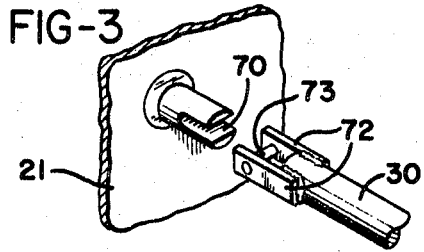
FIG. 3 is a perspective view of the drive knuckle joint for the mixing member.
Figure 4:
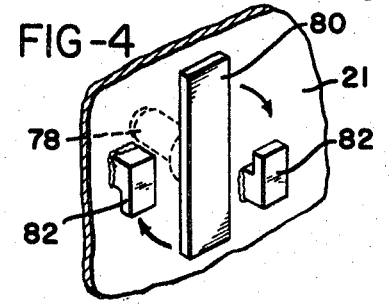
FIG. 4 is a perspective view of the removable stud supporting the mixing member.

The forward bearing 64 includes a suitable seal (not shown) and the forward end of the shaft 63 is provided with a slot 70 (FIG. 3) which forms part of a drive knuckle for the mixing member 28. The part of the knuckle carried on shaft 30 of the mixing member includes a pair of side pieces or extensions 72 between which there is a cross pin 73 dimensioned to fit snugly within slot 70.

At its forward end the mixing arm shaft 30 is provided with a bore 75 holding a bearing sleeve 76. A mounting stud 78 extends into this sleeve through an opening in the hopper front wall 21, and a cross plate 80 is fastened to the outer end of the stud, and can be rotated to lock behind a pair of ears 82 welded or otherwise secured to the exterior of the front wall 21.

Figure 2:
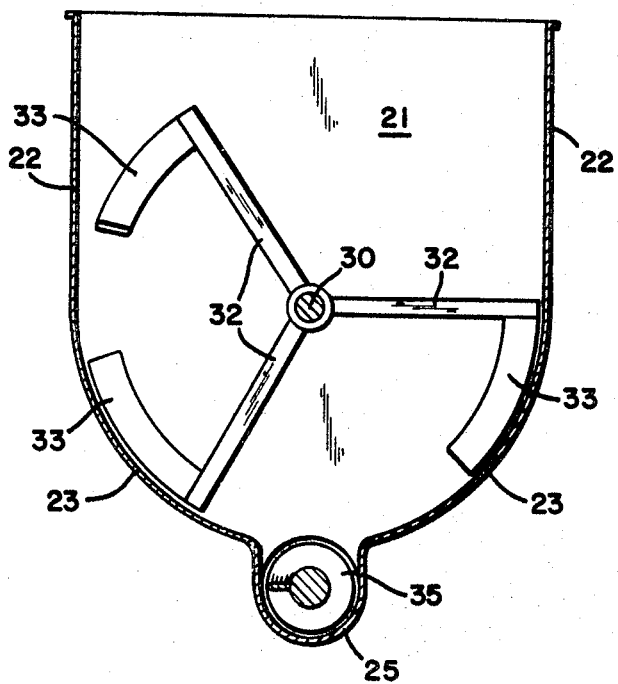
FIG. 2 is a cross-sectional view of the hopper and discharge screw, taken on line 2–2 in FIG. 1.

In operation, rotation of the motor in a direction to produce counterclockwise rotation of the mixing member 28, as viewed in FIG. 2 and from the left of FIG. 1, will produce a mixing action on materials placed in the hopper. However, in this direction of rotation the one-way clutch 50 is arranged so as not to transmit power to the intermediate shaft 52, and the discharge screw will remain stationary. When the direction of motor 12 is reversed, the mixing member will rotate in the opposite direction and the screw 35 will be rotated clockwise as viewed in FIG. 2, carrying the mixing material forward into the barrel 38 of the grinding mechanism, or any other suitable discharge mechanism attached to the machine.

When it is desired to clean the machine, the stud 78 can be withdrawn by rotating the arm 80 out of engagement with the case 82 and then withdrawing the stud through the front wall 21. The drive knuckle joint can then readily be separated to allow for removal of the entire mixing arm for cleaning outside of the machine. The discharge screw can be withdrawn through the front of the barrel 38 after the ring and plate are removed in the usual manner. This leaves only the drive head 55 and the slotted forward end of the mixing arm control shaft 63 exposed within the chopper, and these parts can readily be washed and flushed clean, to avoid clinging of food particles to these parts.

A conventional reversing control can be provided for the motor 12, thus the operator can easily select "mix only" or "mix and discharge" functions merely by pushing the desired button of a switch, or a similar arrangement. The gear case, sprocket drive, and appropriate parts of the base also may be enclosed with a suitable housing (not shown).

While the form of apparatus herein described constitutes a preferred embodiment of the invention, it is to be understood that the invention is not limited to this precise method and form of apparatus, and that changes may be made in either without departing from the scope of the invention.

We claim:

1. A mixing machine for food products comprising a hopper having generally downwardly and inwardly extending sidewalls and a trough connecting the lower edges of said sidewalls, a mixing member extending between said sidewalls and above said trough, front and rear walls connecting said sidewalls and including mountings for opposite ends of said mixing member providing for rotation of the member, a barrel extending from the lower portion of said front wall coaxial with and opening into said trough, a discharge screw extending along said trough from said barrel to said rear wall, drive means including a reversible motor, speed reducing means connected between said motor and said screw, additional speed reducing means connecting said mixing member to said motor, and a one-way clutch connected between said speed reducing means and said screw arranged to cause rotation of said screw only when said motor and speed reducing means is rotating in the direction producing feeding action of said screw into said barrel whereby operation of the motor in the opposite direction causes rotation only of said mixing member.

2. A machine as defined in claim 1, wherein said barrel includes means for mounting a grinder plate and knife, and said screw includes a grinder screw section within said barrel and cooperating therewith to grind the product discharged into said barrel.

3. A machine as defined in claim 1, wherein said mountings for said mixing member include a drive knuckle extended through said rear wall, a stud removably mounted on said front wall, said mixing member having a shaft with a coupling at one end engageable in said knuckle and a bore at its other end receiving said stud so that withdrawal of said stud allows movement of said mixing member to a position where said coupling can be withdrawn from said knuckle.

4. A machine as defined in claim 1, wherein said mixing member includes a central shaft, a plurality of arms extending outwardly of said shaft spaced lengthwise thereof, and curved extensions on said arms projecting generally longitudinally of said hopper whereby material over the full length of said hopper is mixed in both a transverse and longitudinal direction during each revolution of said shaft.

5. A machine as defined in claim 1, including a base supporting said motor, a housing for said speed reducing means and said clutch also supported on said base and extending partially over said motor, said rear wall being secured to said housing, and means supporting said barrel from said base.